(12) United States Patent
Li (10) Patent No.: US 12,539,417 B2
(45) Date of Patent: Feb. 3, 2026

(54) IONTOPHORESIS ADMINISTRATION DEVICE

(71) Applicant: Shanghai Futai Technology Co., Ltd., Shanghai (CN)

(72) Inventor: Ang Li, Shanghai (CN)

(73) Assignee: Shanghai Futai Technology Co., Ltd., Shanghai (CN)

( * ) Notice: Subject to any disclaimer, the term of this patent is extended or adjusted under 35 U.S.C. 154(b) by 954 days.

(21) Appl. No.: 17/771,077

(22) PCT Filed: Dec. 21, 2020

(86) PCT No.: PCT/CN2020/138100
§ 371 (c)(1),
(2) Date: Apr. 22, 2022

(87) PCT Pub. No.: WO2021/078311
PCT Pub. Date: Apr. 29, 2021

(65) Prior Publication Data
US 2022/0370796 A1 Nov. 24, 2022

(30) Foreign Application Priority Data
Oct. 23, 2019 (CN) .......................... 201911012687.X (51) Int. Cl.
*A61N 1/32* (2006.01)
*A61N 1/30* (2006.01)

(52) U.S. Cl.
CPC .............. *A61N 1/303* (2013.01); *A61N 1/325* (2013.01)

(58) Field of Classification Search
CPC .......... A61N 1/30; A61N 1/325; A61N 1/323; A61N 1/32
See application file for complete search history.

(56) References Cited

U.S. PATENT DOCUMENTS

| 4,764,164 A * | 8/1988 | Sasaki ................... A61N 1/044 604/20 |
| 5,328,452 A | 7/1994 | Sibalis |
| 2014/0378555 A1 | 12/2014 | Hung et al. |

FOREIGN PATENT DOCUMENTS

| CN | 1068509 A | 2/1993 |
| CN | 2179162 Y | 10/1994 |

(Continued)

OTHER PUBLICATIONS

European Search Report issued Jun. 22, 2023 in European Application No. 20879570.8.

(Continued)

*Primary Examiner* — Deanna K Hall
(74) *Attorney, Agent, or Firm* — NKL Law; Bin Lu; Allen Xue (57) ABSTRACT

An iontophoresis administration device includes: a power source, used to generate the pulsed direct current required to cause a medicinal agent to permeate an administration region of an organism, wherein the power source generates a forward pulsed direct current during a first time period and a reverse pulses direct current during a second period of time; a dielectric layer, configured to be in contact with the administration region, wherein the dielectric layer includes or has attached thereto an active agent that is to permeate the administration region via a pulsed direct current; and at least two electrodes, used to receive the pulsed direct current outputted by the power source, facilitating the provision of the received pulsed direct current to the dielectric layer. The iontophoresis administration device provided by the present disclosure not only increases the skin permeation rate, but is also not likely to irritate or harm the skin.

8 Claims, 4 Drawing Sheets

(56) References Cited

FOREIGN PATENT DOCUMENTS

| | | |
|---|---|---|
| CN | 109200464 A | 1/2019 |
| GB | 2372705 A | 9/2002 |
| JP | H4-224770 A | 8/1992 |
| JP | H4-312471 A | 11/1992 |
| JP | H-076791 A | 1/1995 |
| JP | 2005334408 A | 12/2005 |
| JP | 2019-517354 A | 6/2019 |
| WO | 9428967 A1 | 12/1994 |

OTHER PUBLICATIONS

Examination Report issued May 11, 2023 in Australian Application No. 2020369800.
Office Action issued Apr. 24, 2023 in Japanese Patent Application No. 2022-523866 (with English Translation).
Int'l Search Report issued Mar. 22, 2021 in Int'l Application No. PCT/CN2020/138100.

* cited by examiner

IONTOPHORESIS ADMINISTRATION DEVICE

CROSS-REFERENCE TO RELATED APPLICATIONS

This application is a Section 371 of International Application No. PCT/CN2020/138100, filed Dec. 21, 2020, which was published in the Chinese language on Apr. 29, 2021 under International Publication No. WO 2021/078311 A1, which claims priority under 35 U.S.C. § 119 to Chinese Patent Application No. 201911012687.X, filed on Oct. 23, 2019 the disclosures of all of which are incorporated herein by reference in their entireties.

TECHNICAL FIELD

This application relates to an administration device, in particular to an iontophoresis administration device.

BACKGROUND

Iontophoresis is an electrotherapy in which an electric current is used to drive and facilitate an active agent (drug or other therapeutic agent) through a skin (usually, the stratum corneum of the skin has a barrier effect), and ultimately deliver the active agent (drug or other therapeutic agent) to the patient's blood. Traditional iontophoresis administration device scheme, for example, continuously provides a direct current with a certain voltage amplitude to penetrate the drug to be penetrated into the administered region of the organism.

In traditional iontophoresis administration device, there is charge accumulation since current flows in only one direction. On the one hand, excessive charge accumulation can cause severe burns to the skin or tissue in the administered region. On the other hand, continuous direct current will have a polarization effect on the skin, and the amount of current that can be delivered over time may be limited by the accumulated charge, which in turn will limit the administration efficiency.

Therefore, traditional iontophoresis is at least prone to cause skin damage in the administered region, and the administration efficiency is low.

SUMMARY OF THE INVENTION

According to an exemplary embodiment of the present disclosure, there is provided an iontophoresis administration device which is capable of improving the osmotic administration efficiency and not easily causing skin damage in the administered region.

In a first aspect of the present disclosure, there is provided an iontophoresis administration device. The device comprises: a power source, used to generate a pulsed direct current required to permeate a medicament to be permeated into an administered region of an organism, wherein the power source generates a forward pulsed direct current during a first time period and a reverse pulsed direct current during a second time period; a dielectric layer, configured to be in contact with the administered region, wherein the dielectric layer comprises or has attached thereto an active agent that is used to permeate into the administered region via the pulsed direct current; and at least two electrodes, used to receive the pulsed direct current outputted from the power source, facilitating the provision of the received pulsed direct current to the dielectric layer.

In some embodiments, current amplitudes, frequencies, and duty cycles of the forward pulsed direct current and the reverse pulsed direct current are preset or adjustable.

In some embodiments, the power source alternately generates the forward pulsed direct current and the reverse pulsed direct current, and a difference between an amount of the forward pulsed direct current generated by the power source during the first time period and an amount of the reverse pulsed direct current generated by the power source during the second time period is less than or equal to a preset value.

In some embodiments, the at least two electrodes conform to at least one of the following: the at least two electrodes are electrically connected with an integral dielectric layer; the at least two electrodes are electrically connected with a plurality of mutually independent dielectric layers; the at least two electrodes are fixed on the dielectric layer; and the at least two electrodes are electrically connected with the dielectric layer in a detachable manner.

In some embodiments, at least one of the forward pulsed direct current and the reverse pulsed direct current conforms to at least one of the following: at least one of the first time period and the second time period is between 1 second and 30 minutes; the frequency is between 100 Hz and 50 kHz; and the current amplitude is between 0.1 mA and 10 mA.

In some embodiments, setting of at least one of the frequency, the current amplitude, and the duty cycle is associated with characteristics of the administered region, the characteristics being determined via measurements.

In some embodiments, in at least one of the first time period and the second time period, the duty cycle is a first duty cycle preset value, and the frequency varies between a first frequency threshold and a second frequency threshold.

In some embodiments, in at least one of the first time period and the second time period, the frequency is a first frequency preset value, and the duty cycle varies between a first duty cycle threshold and a second duty cycle threshold.

In some embodiments, in at least one of the first time period and the second time period, the frequency varies between a first frequency threshold and a second frequency threshold, and the duty cycle varies between a first duty cycle threshold and a second duty cycle threshold.

In some embodiments, the device further comprises a gel, the gel comprises or has attached thereto one or more of the active agents.

It should be understood that the content described in the summary section is not intended to limit the critical or important features of the embodiments of the present disclosure, nor is it intended to limit the scope of the present disclosure. Other features of the present disclosure will be readily understood by the following description.

BRIEF DESCRIPTION OF THE FIGURES

The above and other features advantages and aspects of various embodiments of the present disclosure will become more apparent when taken in conjunction with the accompanying figures and with reference to the following detailed description. In the drawings, the same or like reference numerals indicate the same or like elements, wherein.

DETAILED DESCRIPTION

Embodiments of the present disclosure will be described in more detail below with reference to the accompanying figures. While certain embodiments of the present disclosure are shown in the accompanying figures, it should be understood that the present disclosure may be embodied in various forms and should not be construed as being limited to the embodiments set forth herein. But these embodiments are provided for a more thorough and complete understanding of the present disclosure It should be understood that the figures and embodiments of the present disclosure are for exemplary purposes only and are not intended to limit the scope of protection of the present disclosure.

In the description of embodiments of the present disclosure, the term "comprising/including" and similar terms should be understood as open comprising, i.e., "comprising but not limited to". The term "based" should be understood as "based at least in part". The term "an embodiment" or "the embodiment" should be understood as "at least one embodiment". The terms "first", "second", etc. may refer to different or identical objects. Other definitions, both explicit and implicit, may be included below.

As described above, in traditional iontophoresis administration device, since the current with a fixed amplitude provided by the administration device flows continuously in only one direction, it is easy to cause charge accumulation. On the one hand, excessive charge accumulation can cause severe burn to the skin or tissue in the administered region. On the other hand, continuous direct current will have a polarization effect on the skin, and the amount of current that can be delivered over time will be limited, which leads to low administration efficiency.

To address at least one of the above problems and one or more of other potential problems, exemplary embodiments of the present disclosure propose an iontophoresis administration device. The device comprises: a power source, used to generate a pulsed direct current required to permeate a medicament to be permeated into an administered region of an organism, wherein the power source generates a forward pulsed direct current during a first time period and a reverse pulsed direct current during a second time period; a dielectric layer, configured to be in contact with the administered region, wherein the dielectric layer comprises or has attached thereto an active agent that is used to permeate into the administered region via the pulsed direct current; and at least two electrodes, used to receive the pulsed direct current outputted from the power source, facilitating the provision of the received pulsed direct current to the dielectric layer.

Figure 1:
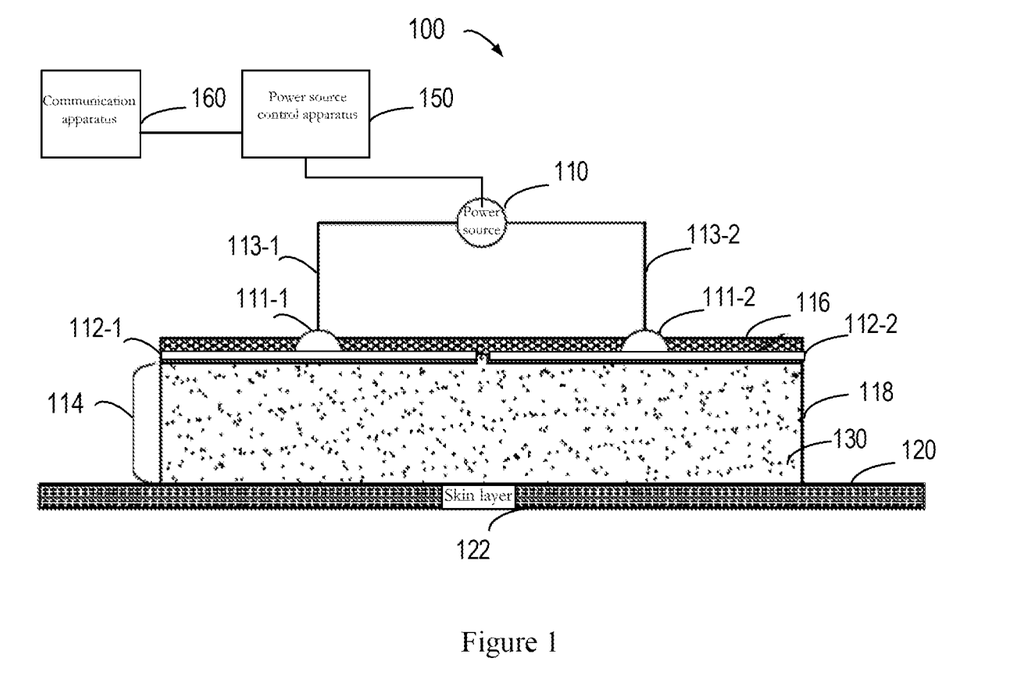
FIG. 1 shows a schematic diagram of an iontophoresis administration device 100 according to some embodiments of the present disclosure.

In the above scheme, by using the power source to generate the forward pulsed direct current during the first time period and the reverse pulsed direct current during the second time period, the iontophoresis administration device can avoid the problems of charge accumulation and skin polarization through the pulsed direct currents that change in the direction during different time periods. Moreover, individual characteristic differences between different subjects can be adapted through changes in the current intensity (current amplitude), frequency, and duty cycle of the pulsed direct current, so as to avoid skin irritation or damage due to insufficient medicament penetration or skin polarization. Therefore, the iontophoresis administration device of the present disclosure can improve the administration efficiency while not easily causing skin damage in the administered region. Poi FIG. 1 shows a schematic diagram of an iontophoresis administration device 100 according to an embodiment of the present disclosure. In this exemplary iontophoresis administration device 100, it includes at least: one or more power sources 110, a dielectric layer 114, and at least two electrodes 112-1 and 112-2. In some embodiments, the iontophoresis administration device 100 further comprises a power source control apparatus 150 for controlling the power source 110, and a communication apparatus 160. The power source control apparatus 150 is electrically connected to the power source 110 and the communication apparatus 160. The power source control apparatus 150 is used to control the power source 110. The communication apparatus 160 is used to receive and send data associated with iontophoresis administration. It should be understood that the iontophoresis administration device 100 may also include components not shown and/or may omit components shown, the scope of the present disclosure being not limited in this regard.

With regard to the power source 110, which is used to generate the pulsed direct current required to permeate a medicament to be permeated into an administered region of an organism, for example, the power source 110 generates the forward pulsed direct current during the first time period and the reverse pulsed direct current during the second time period. In some embodiments, the power source 110 generates the reverse pulsed direct current during the first time period and the forward pulsed direct current during the second time period. In some embodiments, the iontophoresis administration device 100 comprises one power source. In some embodiments, the iontophoresis administration device 100 comprises a plurality of power sources. The plurality of power sources may be connected in series and/or in parallel with each other for providing appropriate voltages and currents to permeate a medicament to be permeated into the administered region.

With regard to the dielectric layer 114, it is used to contact with the administered region, wherein the dielectric layer comprises or has attached thereto an active agent that is used to permeate into the administered region via the pulsed direct current. The dielectric layer 114 is generally overlaid on the administered region 122 of the organism 120 and adapts to the profile of the administered region 122. The dielectric layer 114 is provided, for example, in the profile of a mask. In some embodiments, the dielectric layer 114 comprises a porous structure (not shown) and a gel 118. The gel 118 includes a medicament to be permeated 130 in a polar, free state, which is dispersed in the skeleton structure of the gel 118. The dielectric layer 114 may have a preset resistance value. In some embodiments, the dielectric layer 114 is an integral dielectric layer electrically connected with the at least two electrodes. In some embodiments, the dielectric layer 114 is a plurality of mutually independent dielectric layers which are electrically connected to the above-mentioned at least two electrodes, respectively. In some embodiments, the plurality of mutually independent dielectric layers are in contact with the same body region, for example, for facial administration. In some embodiments, the plurality of mutually independent dielectric layers are in contact with different body regions, for example, one dielectric layer for facial administration and another dielectric layer for wrist or neck administration.

With regard to the at least two electrodes 112-1 and 112-2, they are used to receive the pulsed direct current outputted from the power source, facilitating the provision of the received pulsed direct current to the dielectric layer. In some embodiments, the electrodes comprise a first electrode 112-1 and a second electrode 112-2, wherein the first electrode 112-1 is electrically connected to a first end of the power source 110 through the connector 111-1 and the wire 113-1, and the second electrode 112-2 is electrically connected to a second end of the power source 110 through the connector 111-2 and the wire 113-2. The first electrode 112-1 and the second electrode 112-2 are covered with a backing layer 116.

With regard to the connection of the electrodes 112-1 and 112-2 to the dielectric layer 114, in some embodiments, at least two electrodes 112-1 and 112-2 are fixed (e.g., arranged in a detachable manner) on the dielectric layer and electrically connected to the dielectric layer 114. For example, the electrodes 112-1 and 112-2 are affixed to the dielectric layer 114 and electrically connected to the dielectric layer 114. The electrodes 112-1 and 112-2 affixed to the dielectric layer 114 can be stripped without affecting the dielectric layer 114 and the electrodes 112-1 and 112-2. For example, the electrodes 112-1 and 112-2 can be fixed on the dielectric layer 114 in a detachable manner through snap structures coupled to each other. The electrodes 112-1 and 112-2 can also be fixed on the dielectric layer 114 in a detachable manner through magnetic attraction structures. The electrodes 112-1 and 112-2 may also have clamping structures, and the electrodes 112-1 and 112-2 may be electrically connected to the dielectric layer 114 by being clamped on the dielectric layer 114.

With regard to the administered region 122, in some embodiments, it is, for example, a local skin of the human body, such as facial skin, neck skin, etc. The dielectric layer 114 is provided, for example, in the profile of a mask. Due to individual skin differences (for example, differences in the ratio of water to oil, dryness degree, pores, etc.), there are certain differences in characteristics of individual skin. Thus, for these differences in characteristics of the administered region, the power source included in the iontophoresis administration device of the present disclosure generates the pulsed direct current required to permeate the medicament to be permeated into the administered region of the organism. The power source generates the forward pulsed direct current during the first time period and the reverse pulsed direct current during the second time period.

With regard to the medicament to be penetrated 130, it is for example but not limited to the medicament for pain relief, treatment of arthritis or asthma, hormone regulation, cosmetic and the like purposes. In some embodiments, the medicament to be permeated 130 comprises vitamin C and arbutin, or vitamin C and tranexamic acid.

In some embodiments, the iontophoresis administration device 100 of the present disclosure further comprises a gel 118, and the gel 118 comprises or has attached thereto one or more of the active agents.

With regard to the gel 118, it comprises for example but not limited to a matrix, an active medicament and an additive agent. In some embodiments, the gel 118 comprises, for example, at least one or more of the following components: polyethylene glycol, polyvinyl alcohol, polyhydroxyethyl methacrylate, polyacrylic acid, polymethacrylic acid, gelatin, alginic acid.

Figure 2:
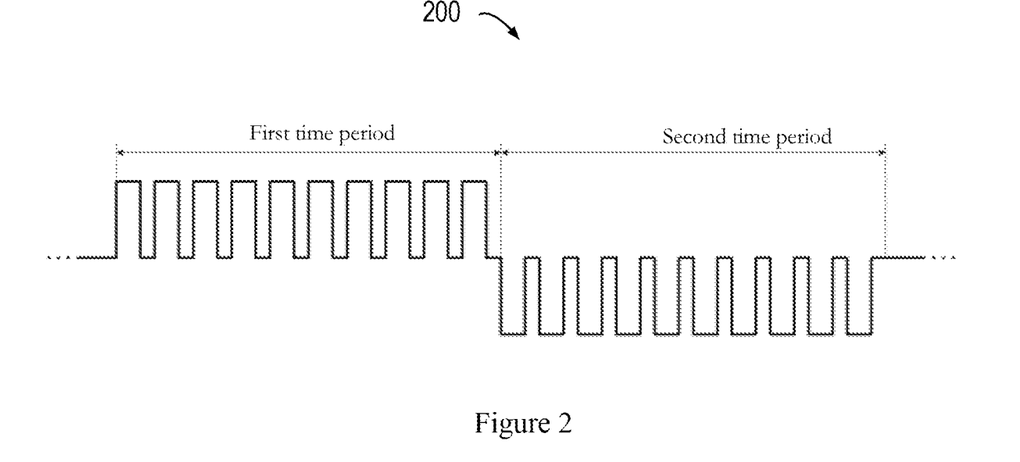
FIG. 2 shows a schematic diagram of a pulsed direct current 200 according to an embodiment of the present disclosure.

The following describes the characteristics of the pulsed direct current in terms of the current amplitude, frequency and duty cycle in conjunction with FIG. 2. FIG. 2 shows a schematic diagram of a pulsed direct current 200 according to an embodiment of the present disclosure. According to the power source 110 of the iontophoresis administration device 100 of the present disclosure, the current amplitude, frequency and duty cycle of the provided pulsed direct current may be preset value. For example, the current amplitude, frequency, and duty cycle of the forward pulsed direct current provided by the power source 110 during the first time period are equal or substantially equal to the current amplitude, frequency, and duty cycle of the reverse pulsed direct current provided by the power source 110 during the second time period.

In some embodiments, the pulsed direct current is either adjustable in the current amplitude, frequency and duty cycle during the time period of the forward pulse or during the time period of the reverse pulse. For example, the current amplitude, frequency and duty cycle of the forward pulsed direct current provided by the power source 110 during the first time period can be adjusted to other values different from the preset value.

In some embodiments, the power source 110 alternately generates the forward pulsed direct current and the reverse pulsed direct current, and a difference between an amount of the forward pulsed direct current generated by the power source 110 during the first time period and an amount of the reverse pulsed direct current generated by the power source 110 during the second time period is less than a preset value, or equal to a preset value. For example, the preset value is zero. For example, the preset value is 0.01, 0.02, 0.03, . . . , or 0.1 Cullen.

In some embodiments, the frequency of at least one of the forward pulsed direct current and the reverse pulsed direct current generated by the power source 110 is between 100 Hz and 50 kHz. In some embodiments, the current amplitude of at least one of the forward pulsed direct current and the reverse pulsed direct current generated by the power source 110 is between 0.1 mA and 10 mA. In some embodiments, at least one of the forward pulsed direct current and the reverse pulsed direct current generated by the power source 110 conform to: at least one of the first time period and the second time period are between 1 second and 30 minutes. By controlling the frequencies, the current amplitudes and durations of the forward and reverse pulsed direct currents, it is ensured that the administration device of the present disclosure can not only enable the administration device to match the characteristic differences between individual skins caused by differences in water oil ratio, dryness degree, pore condition, etc. of individual skins. In addition, studies have shown that the transdermal efficiencies of different administered components are different under different frequencies, current amplitudes and durations of the forward pulse direct current and the reverse pulse direct current. Generally, for different administration purposes, the dielectric layer may include or attach thereto different active agents or administered components. By controlling the above-mentioned electrical parameters of the forward and reverse pulsed direct currents, it is beneficial to improve the transdermal efficiency.

It should be understood that the current amplitude, frequency and duty cycle of the pulsed direct current shown in FIG. 2 are exemplary only and do not represent that the current amplitude, frequency and duty cycle of the forward pulse during the first period are necessarily equal or substantially equal to the current amplitude, frequency and duty cycle of the reverse pulse during the second period.

Figure 3:
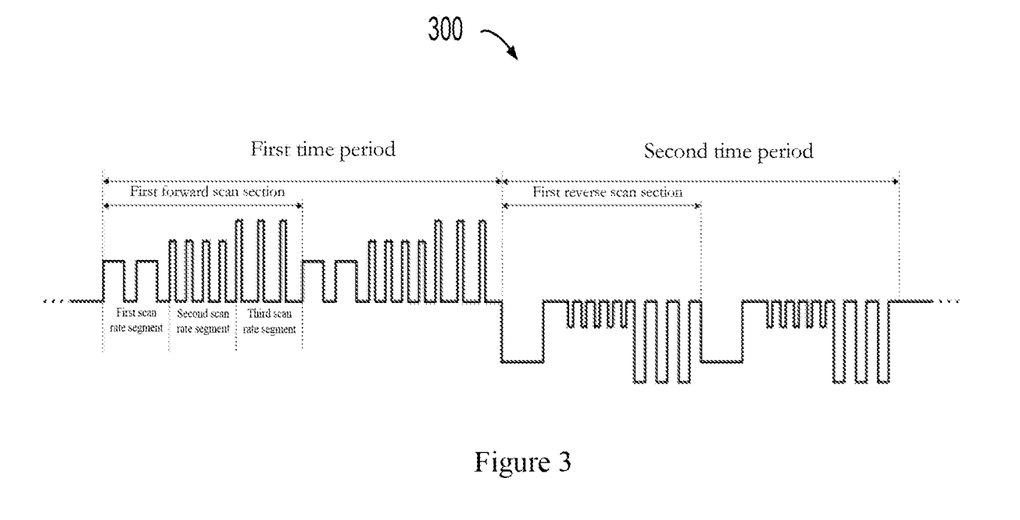
FIG. 3 shows a schematic diagram of a pulsed direct current 300 according to an embodiment of the present disclosure.

FIG. 3 shows a schematic diagram of a pulsed direct current 300 according to an embodiment of the present disclosure. The setting of at least one of the frequency, the current magnitude, and the duty cycle of the pulsed direct current provided by the power source 110 of the iontophoresis administration device 100 is associated with the characteristics of the administered region. The characteristics may be determined via measurements. This is because the choice of the current amplitude, frequency, and duty cycle of the pulsed direct current is highly dependent on several factors, including the active agent, medium formulation, and the user's skin condition. Therefore, as the user's skin condition changes, fixed frequency and duty cycle may not be optimal or sufficient for skin penetration of all active agents. For example, different subjects may require different times to depolarize the skin so that resistance in the electrokinetic driving force is minimized, which will allow better penetration of the active agent into the skin.

In some embodiments, the first time period corresponding to the forward pulsed direct current, for example, comprises at least one scan section, wherein each forward scan section, for example, comprises one or more forward scan rate segments. For example, the first forward scan segment includes, for example, a first scan rate segment, a second scan rate segment, and a third forward scan rate segment. Each of the first scan rate segment, the second scan rate segment, and the third scan rate segment is illustrated in FIG. 3 as having different current amplitudes, frequencies, and duty cycles. For example, the forward pulsed direct current shown in the first scan rate segment of the first forward scan section has the current amplitude with a first current amplitude, the frequency with a first frequency value, and the duty cycle with a first duty cycle value; the forward pulsed direct current shown in the second scan rate segment has the current amplitude with a second current amplitude, the frequency with a second frequency value, and the duty cycle with a second duty cycle value; the forward pulsed direct current shown in the third scan rate segment has the current amplitude with a third current amplitude, the frequency with a third frequency value, and the duty cycle with a third duty cycle value. For example, the first scan rate segment of the first forward scan section includes two forward pulses with identical current amplitudes, frequencies, and duty cycles. The second scan rate segment of the first forward scan section includes four forward pulses with identical current amplitudes, frequencies and duty cycles. The third scan rate segment of the first forward scan section includes three forward pulses with identical current amplitudes, frequencies and duty cycles. In some embodiments, the current amplitudes, frequency values, and duty cycle values that are preset or adjusted for each segment are different. For example, in the first time period corresponding to the forward pulse, after experiencing the forward pulse of the current amplitude, frequency and duty cycle of the pulsed direct current of the first forward scan section, it again experiences a forward pulse with the same current amplitude, frequency and duty cycle of the pulsed direct current as that of the first forward scan section. It should be understood that the corresponding forward pulse of the second forward scan section (not shown) during the first time period may be different from the forward pulse of the first forward scan section in current amplitude, frequency and duty cycle.

In some embodiments, the second time period corresponding to the reverse pulse includes one or more reverse scan sections. For example, the first reverse scan section shown in FIG. 3 includes a plurality of scan rate segments with different current amplitude, frequency and duty cycle setting values. The second scan rate segment of the first reverse scan section includes five reverse pulses with identical current amplitude, frequency and duty cycle. The third scan rate segment of the first reverse scan section includes three reverse pulses with identical current amplitude, frequency and duty cycle. In some embodiments, the current amplitude, frequency value, and duty cycle value that are preset or adjusted for each segment are different. For example, in the second time period corresponding to the reverse pulse, after experiencing the reverse pulse of the current amplitude, frequency and duty cycle of the pulsed direct current of the first reverse scan section, it again experiences a reverse pulse with the same current amplitude, frequency and duty cycle of the pulsed direct current as that of the first reverse scan section.

In some embodiments, the current amplitude of the pulsed direct current of each scan rate segment in the forward scan sections or the reverse scan sections is preset or adjustable, that is, the current amplitude of the pulse of each scan rate segment may be different or identical. The current amplitude of the pulsed direct current in the first scan rate segment of the first forward scan section is less than the current amplitude of the pulsed direct current in the second scan rate segment, and less than the current amplitude of the pulsed direct current in the third scan rate segment. In other words, in the first scan rate segment, the current amplitude of the pulsed direct current is maintained at a relatively small value, in the second scan rate segment, the current amplitude of the pulsed direct current is maintained at a relatively medium value, and in the third scan rate segment, the current amplitude of the pulsed direct current is maintained at a relatively high value. It should be understood that the current amplitudes of pulsed direct current may be increased one by one, decreased one by one, increased or decreased alternately, or adjusted in other ways.

In some embodiments, the frequency of the pulsed direct current of each scan rate segment in the forward scan sections or the reverse scan sections is preset or adjustable, that is, the frequency of the pulse of each scan rate segment may be different or identical. The duty cycle value of the pulsed direct current of each scan rate segment is also preset or adjustable. The frequencies or duty cycles of the pulsed direct current may be increased one by one, decreased one by one, increased or decreased alternately, or adjusted in other ways. In some embodiments, the absolute values of the various parameters in the first forward scan section may be substantially equal to the absolute values of the various parameters in the first reverse scan section, and there may also be differences, for example, within a range of deviation of positive and negative 20%. It should be understood that it is necessary to ensure that the total powers of the forward and reverse pulses are substantially the same, preferably not exceeding the deviation range of the positive and negative 20%.

FIG. 3 is only an example of dividing the first time period in the forward pulse into the first forward scan section, and dividing the first scanning rate segment, the second scan rate segment and the third scan rate segment in the first forward scan section. Such an exemplary division does not necessarily mean that the first forward scan section can only include three scan rate segments (i.e., the first scan rate segment, the second scan rate segment, and the third scan rate). The first time period may include more or fewer forward scan sections, and each forward scan section may also include more or fewer scan rate segments. Similarly, the second time period may also include more reverse scan sections, and each reverse scan section may also include more or fewer scan rate segments.

Figure 4:
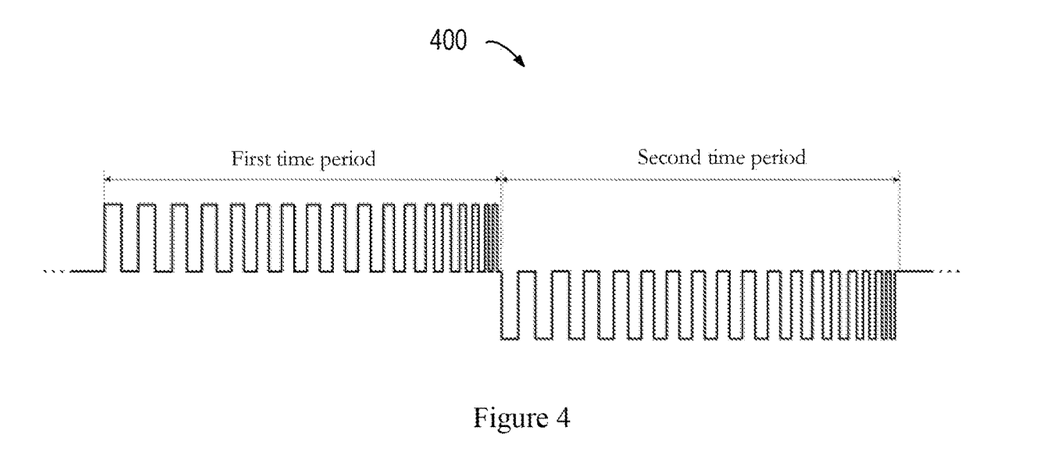
FIG. 4 shows a schematic diagram of a pulsed direct current 400 according to an embodiment of the present disclosure.

It will be illustrated below in conjunction with FIG. 4 that in at least one of the first time period and the second time period, the electric duty cycle of the pulsed direct current provided by the power source 110 of the iontophoresis administration device 100 is a preset value (e.g., a first duty cycle preset value), and the frequency of the pulsed direct current provided is varied (e.g., between a first frequency threshold and a second frequency threshold). FIG. 4 shows a schematic diagram of a pulsed direct current 400 according to an embodiment of the present disclosure.

As shown in FIG. 4, in the first time period corresponding to the forward pulse, the frequency of the pulsed direct current becomes larger and larger, and the duty cycle is a preset value. In the second time period when the power source provides the reverse direct current pulse, the frequency of the pulsed direct current increases from low to high, and the duty cycle is still the preset value. In this way, the frequency of the pulsed direct current becomes larger (higher), which means that the number of pulses of electroosmosis of the iontophoresis administration device 100 to the administered region per unit time becomes larger and larger. While the frequency increases but the duty cycle remains unchanged, it means that the electroosmotic duration of a single pulse of the iontophoresis administration device 100 to the administered region becomes shorter.

The change of the frequency of the pulsed direct current shown in FIG. 4 is only illustrative. In some embodiments, the change of the frequency of the pulsed direct current is not necessarily a regular change from small to large or from large to small, but may also be other changes, for example, it may be from large to small and then from small to large, or it may be from small to large and then from large to small. In some embodiments, by setting the first frequency threshold and the second frequency threshold, a range of frequency variations may be preset, which may be determined based on the measured individual skin characteristics or the administered components. In some embodiments, the frequency change and the fixed value setting of the duty cycle of the reverse pulsed direct current in the second time period do not necessarily refer to (for example, equal to) the frequency change and the fixed value setting of the duty cycle of the forward pulsed direct current in the first time period. The principle is that as long as it is guaranteed that the power of the forward pulsed direct current in the first time period provided by the power source 110 of the iontophoresis administration device is substantially the same as that of the reverse pulse direct current in the second time period, or does not exceed the preset deviation range (e.g., positive and negative 20%).

Figure 5:
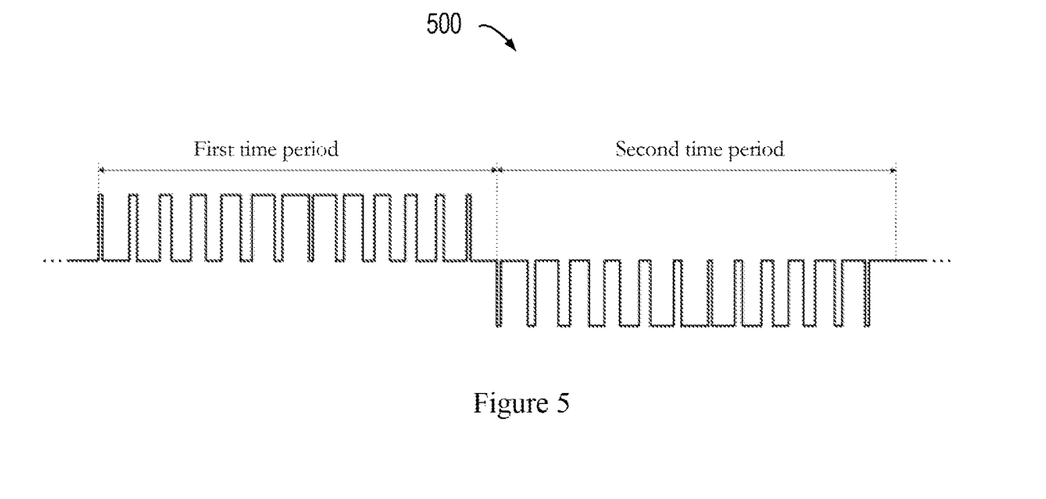
FIG. 5 shows a schematic diagram of a pulsed direct current 500 according to an embodiment of the present disclosure.

It will be illustrated below in conjunction with FIG. 5 that in at least one of the first time period and the second time period, the frequency of the pulsed direct current provided by the power source 110 of the iontophoresis administration device 100 is a preset value (e.g., a first frequency preset value), and the duty cycle of the pulsed direct current provided is varied (e.g., between a first duty cycle threshold and a second duty cycle threshold). FIG. 5 shows a schematic diagram of a pulsed direct current 500 according to an embodiment of the present disclosure.

As shown in FIG. 5, in the first time period, the frequency of the forward pulsed direct current is a preset value, and the duty cycle of the forward pulsed direct current changes from small to large and then from large to small; while in the second time period, the frequency of the reverse pulsed direct current is also a preset value, and the duty cycle of the reverse pulsed direct current changes from small to large and then from large to small. In this way, the frequency of the pulsed direct current does not change, which means that the number of pulses of electroosmosis of the iontophoresis administration device 100 to the administered region per unit time does not change. While the frequency does not change and the duty cycle changes, it means that the electroosmotic duration of a single pulse of the iontophoresis administration device 100 to the administered region becomes longer (corresponding that the duty cycle becomes larger) or shorter (corresponding that the duty cycle becomes smaller).

It should be understood that the change in the duty cycle of the pulsed direct current shown in FIG. 5 is only illustrative. In some embodiments, the change in the duty cycle is not necessarily a regular change from small to large or from large to small, but may also change in other irregular ways. By setting the first duty cycle threshold and the second duty cycle threshold, that is, by setting the upper and lower limits of the duty cycle threshold, the range of the duty cycle can be preset, which may be determined based on the measured individual skin characteristics (for example, skin sensitivity) or the administered components. In some embodiments, the fixed value setting of the frequency and the change threshold of the duty cycle of the reverse pulsed direct current in the second time period do not necessarily refer to (for example, equal to) the fixed value setting of frequency and the change threshold of the duty cycle of the forward pulsed direct current in the first time period. The principle is that as long as it is guaranteed that the power of the forward pulsed direct current in the first time period provided by the power 110 of the iontophoresis administration device is substantially the same as that of the reverse pulse direct current in the second time period, or does not exceed the preset deviation range (e. g., positive and negative 20%).

Figure 6:
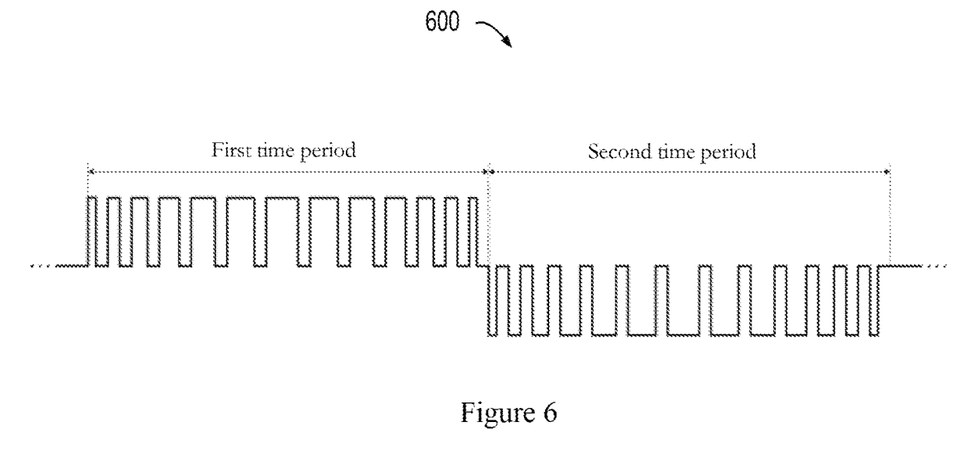
FIG. 6 shows a schematic diagram of a pulsed direct current 600 according to an embodiment of the present disclosure; and In the various figures, the same or corresponding reference numerals indicate the same or corresponding parts.

It will be illustrated below in conjunction with FIG. 6 that in at least one of the first time period and the second time period, the frequency of the pulsed direct current provided by the power source 110 of the iontophoresis administration device 100 is varied (e.g., between the first frequency threshold and the second frequency threshold), and the duty cycle of the pulsed direct current provided is also varied (e.g., between a first duty cycle threshold and a second duty cycle threshold). FIG. 6 shows a schematic diagram of a pulsed direct current 600 according to an embodiment of the present disclosure.

As shown in FIG. 6, in the first time period, the frequency of the forward pulsed direct current changes from large to small and then from small to large, and the duty cycle of the forward pulsed direct current changes from small to large and then from large to small; and in the second time period, the frequency of the reverse pulsed direct current changes from small to large and then from large to small, and the duty cycle of the reverse pulsed direct current changes from small to large and then from large to small. In this way, the frequency of the pulsed direct current changes, which means that the number of pulses of electroosmosis of the iontophoresis administration device 100 to the administered region per unit time changes. While the duty cycle also changes, it means that the electroosmotic duration of a single pulse of the iontophoresis administration device 100 to the administered region also changes.

It should be understood that the changes of the frequency and the duty cycle of the pulsed direct current at the same time shown in FIG. 6 is only illustrative. In some embodiments, the changes of the frequency and the duty cycle of the pulsed direct current is not necessarily a regular change from small to large or from large to small, but may also change in other irregular ways. By setting the first frequency threshold and the second frequency threshold, the first duty cycle threshold and the second duty cycle threshold, the change range of frequency and duty cycle can be preset, which may be determined based on the measured individual skin characteristics (for example, skin sensitivity) or the administered components. In some embodiments, the frequency change and the duty cycle change of the reverse pulsed direct current in the second time period do not necessarily refer to (for example, equal to) the frequency change and the duty cycle change of the forward pulsed direct current in the first time period. The principle is that as long as it is guaranteed that the power of the forward pulsed direct current in the first time period provided by the power 110 is substantially the same as that of the reverse pulse direct current in the second time period, or does not exceed the preset deviation range (e.g., positive and negative 20%).

In some embodiments, one or more electrodes in the iontophoresis administration device 100 may share a single continuous dielectric layer. It is also possible to electrically connect multiple discrete dielectric layers separately. The power source 110 may be configured to provide bipolar pulsed direct current, during the first time period, to provide the forward pulsed direct current, and during the second time period, the provided current to be switched to the reverse pulsed direct current. In order to ensure a balance of the total amount of charge, the total amount of charge delivered during the first time period must be substantially the same as the total amount of charge delivered during the second time period, or not exceed a preset deviation range (e.g., positive and negative 20%). In some embodiments, the duration of the forward or reverse pulsed direct current may be a few seconds or a few minutes, or between 1 second and 1 minute, or 1 minute to 30 minutes. In some embodiments, the duty cycle of the pulsed direct current may be 1% to 100%.

In order to further enhance the efficiency and effectiveness of transdermal administration, and to provide desired quantities of a variety of different active agents, the current amplitude, frequency and duty cycle of the pulsed direct current can be dynamically changed accordingly, so that a variety of different active agents included in or attached to the dielectric layer can be efficiently penetrated into the skin of the administered region under the driving of bidirectional pulsed direct current with matched electroosmotic parameters.

It should be understood that the scan formed by the pulsed direct current described in the present disclosure can have linear, triangular, sine wave, exponential or pseudo-random characteristics, and the scan period can be set or changed between 10 milliseconds and 10 minutes.

The embodiments of the present disclosure have been described above, and the above description is exemplary, not exhaustive, and is not limited to the disclosed embodiments. Many modifications and changes will be apparent to those of ordinary skill in the art without departing from the scope and spirit of the described embodiments. The terminology used herein is chosen to best explain the principles, practical applications or technical improvements in the market of the embodiments, or to enable other persons of ordinary skill in the art to understand the embodiments disclosed herein.

The foregoing descriptions are only optional embodiments of the present disclosure, and are not used to limit the present disclosure. For those skilled in the art, the present disclosure may have various modifications and changes. Any modification, equivalent replacement, improvement, etc. made within the spirit and principle of the present disclosure shall be included in the protection scope of the present disclosure.

What is claimed is:

1. An iontophoresis administration device, comprising:
a power source, used to generate a pulsed direct current required to permeate a medicament to be permeated into an administered region of an organism, wherein the power source generates a forward pulsed direct current during a first time period and a reverse pulsed direct current during a second time period;
a power source control apparatus and a communication apparatus, the power source control apparatus is electrically connected to the power source and the communication apparatus, the power source control apparatus is used for controlling the power source, the communication apparatus is used to receive and send data associated with iontophoresis administration;
a dielectric layer, configured to be in contact with the administered region, wherein the dielectric layer comprises or has attached thereto an active agent that is used to permeate into the administered region via the pulsed direct current; and
at least two electrodes, used to receive the pulsed direct current outputted from the power source, facilitating the provision of the received pulsed direct current to the dielectric layer;
wherein current amplitude, frequency, and duty cycle of the forward pulsed direct current and the reverse pulsed direct current are preset or adjustable;
the first time period corresponding to the forward pulsed direct current comprises at least one scan section, wherein each forward scan section comprises one or more forward scan rate segments, current amplitude, frequency, and duty cycle that are preset or adjusted for each segment are different, so as to avoid charge accumulation and skin polarization, and the active agent can be efficiently penetrated into the skin of the administered region under the driving of bidirectional pulsed direct current with matched electroosmotic parameters; setting of at least one of the frequency, the current amplitude, and the duty cycle is associated with characteristics of the administered region, the characteristics being determined via measurements, the characteristics comprise water oil ratio, dryness degree, pore condition, and skin sensitivity.

2. The device of claim 1, wherein the power source alternately generates the forward pulsed direct current and the reverse pulsed direct current, and a difference between an amount of the forward pulsed direct current generated by the power source during the first time period and an amount of the reverse pulsed direct current generated by the power source during the second time period is less than or equal to a preset value.

3. The device of claim 1, wherein the at least two electrodes conform to at least one of the following:
the at least two electrodes are electrically connected with an integral dielectric layer;
the at least two electrodes are electrically connected with a plurality of mutually independent dielectric layers;

the at least two electrodes are fixed on the dielectric layer; and the at least two electrodes are electrically connected with the dielectric layer in a detachable manner.

4. The device of claim 1, wherein at least one of the forward pulsed direct current and the reverse pulsed direct current conforms to at least one of the following:

at least one of the first time period and the second time period is between 1 second and 30 minutes;

the frequency is between 100 Hz and 50 kHz; and the current amplitude is between 0.1 mA and 10 mA.

5. The device of claim 1, wherein in at least one of the first time period and the second time period, the duty cycle is a first duty cycle preset value, and the frequency varies between a first frequency threshold and a second frequency threshold.

6. The device of claim 1, wherein in at least one of the first time period and the second time period, the frequency is a first frequency preset value, and the duty cycle varies between a first duty cycle threshold and a second duty cycle threshold.

7. The device of claim 1, wherein in at least one of the first time period and the second time period, the frequency varies between a first frequency threshold and a second frequency threshold, and the duty cycle varies between a first duty cycle threshold and a second duty cycle threshold.

8. The device of claim 1, further comprising:

a gel, the gel comprises or has attached thereto one or more of the active agents.

* * * * *